Patented Oct. 25, 1927.

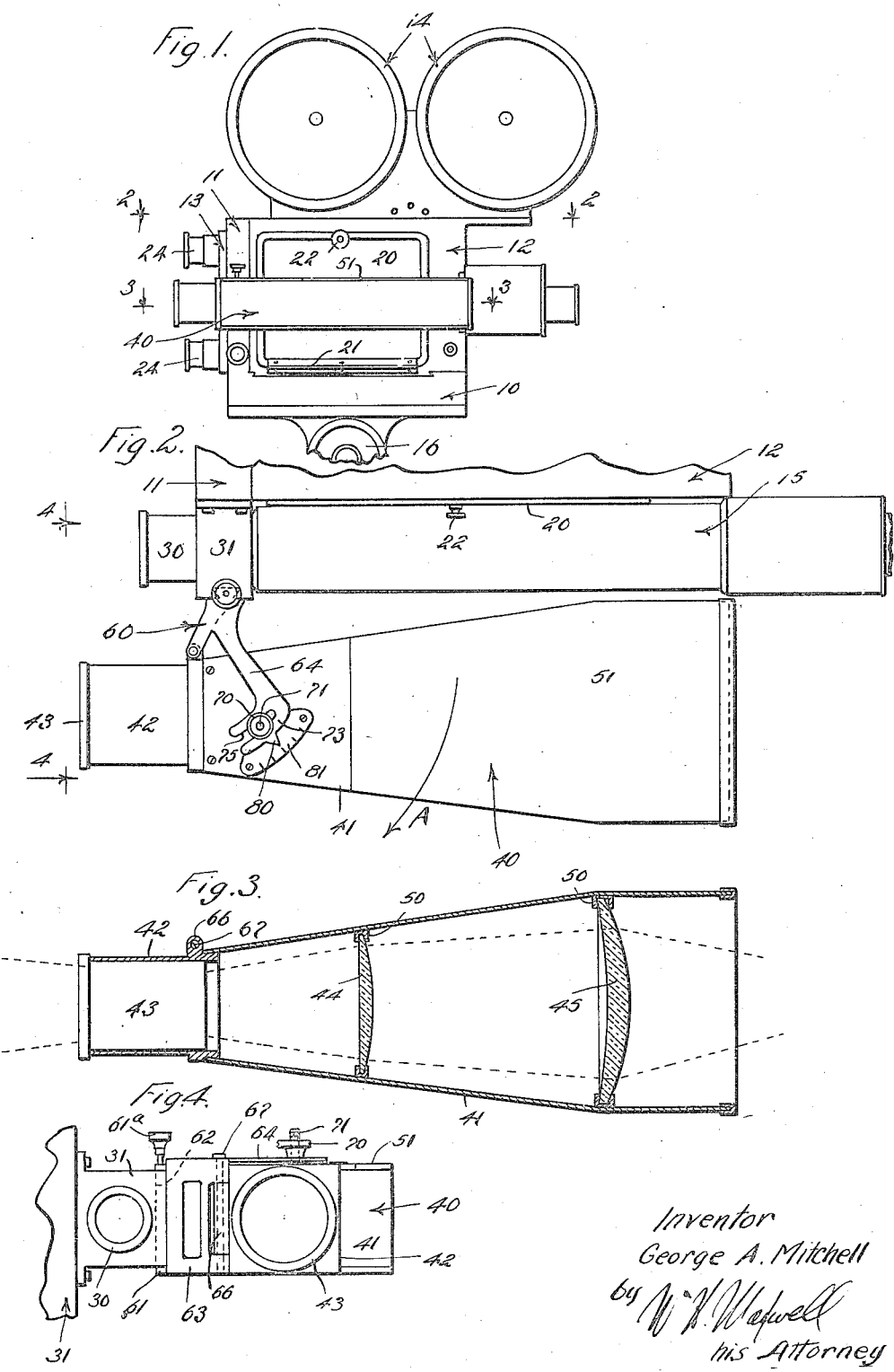

1,646,829

UNITED STATES PATENT OFFICE.

GEORGE A. MITCHELL, OF HUNTINGTON PARK, CALIFORNIA, ASSIGNOR TO MITCHELL CAMERA CORPORATION, OF LOS ANGELES, CALIFORNIA, A CORPORATION OF CALIFORNIA.

VIEWING DEVICE FOR CAMERAS.

Application filed July 16, 1925. Serial No. 44,100.

This invention has to do with a viewing device for cameras, or the like, and with a mounting for such devices; it being an object of the invention to provide a simple, effective and improved viewing device and a mounting for a viewing device whereby it can be conveniently used on a camera without interfering with the operation or movement of the various parts of the camera.

An object of my invention is to provide a viewing device in which the undesirable effect of light entering the rear of the device is minimized.

A further object of the invention is to provide a mounting for a viewing device whereby the device is effectively and securely held in operating position and is readily releasable for movement to a position where it does not interfere with the movement or operation of other parts of the camera, for instance, with the opening of the body of the camera.

The various objects and features of my invention will be best and more fully understood from the following detailed description of a typical and practical embodiment of the invention, throughout which description reference is had to the accompanying drawings in which:

Fig. 1 is a side elevation of a typical motion picture camera showing the device of the present invention applied thereto and in operating or viewing position.

Fig. 2 is an enlarged detailed plan view of a portion of the camera being a view taken as indicated by line 2—2 on Fig. 1.

Fig. 3 is an enlarged detailed plan section of the viewing device provided by this invention being a view taken as indicated by line 3—3 on Fig. 1, and Fig. 4 is a front elevation of the parts shown in Fig. 2 being a view taken as indicated by line 4—4 on Fig. 2.

My invention is particularly useful in connection with or as applied to motion picture cameras and in this connection is applicable generally, to motion picture cameras. I will, in this disclosure set forth only one typical form of my invention and will make reference to only one typical type or form of motion picture camera, it being understood that the invention is capable of embodiment in various forms and that modifications and changes may be made in applying it to cameras differing in detail or in arrangements of parts from that herein set forth.

The particular motion picture camera illustrated in the drawings comprises, generally, a base 10, a head 11 at the forward end of the base, a body 12 immediately behind the head, a lens turret 13 mounted on the front of the head, film magazines 14 mounted on the body, a focusing tube 15 mounted on the body, and various other parts usual to devices of this character. The base 10 is adapted to be mounted on a suitable tripod or support 16 so that it is adjustable in the desired manner. The head 11 is stationary on the base and extends upwardly from the forward end of the base. The body 12 is a box-like structure mounted on the base 10 immediately behind the head 11 and carries the various film handling parts, for instance, an aperture plate, film gate, intermittent movement mechanism, and the various other parts usual to motion picture cameras. These film handling parts being within the body do not show in the drawings. The body 12, in accordance with standard construction is a box-like structure completely housing the various film handling parts just mentioned and provided with a door 20 through which the film handling parts are accessible. The door 20 is located at one side of the body 12 and has its lower edge portion connected to the body by a hinge 21. With this construction the door 20 is lowered or swung outwardly and downwardly when it is desired to reach the parts within the body. A suitable latch 22 is provided on the door for securing it in closed position.

The lens turret 13 is rotatably mounted on the front of the head 11 and carries a plurality of lenses 24 so that the desired one can be brought into operating position in register with the opening (not shown) in the head.

In the particular camera shown in the drawings the focusing tube 15 is mounted on one side of the body 12 in horizontal alignment to the exposure aperture of the camera. The head 11 and body 12 are relatively movable so that the exposure aperture or focusing tube can be brought into alignment with the lens 24 in operating position at the head. This movement or shifting between the head and body is obtained by sliding the body 12 transversely on the base 10. While focusing the camera the body is in position so that the focusing tube is in register with the operating lens and during operation of the camera the body is in position where the aperture plate within the body is in register with the operating lens.

In the camera shown in the drawings an objective lens 30 is mounted on the head in horizontal alignment with the operating lens so that the focusing tube 15 is in alignment with it when the head is in photographing position. By this arrangement the objective lens device 30 and focusing tube 15 form a viewing device when the camera is in photographing position. The objective lens device 30 is carried by a projection 31 on the side of the head and the focusing tube 15 is mounted on or carried by the door 21 of the body.

The viewing device 40 provided by my invention is mounted at one side of the camera in the horizontal plane of the operating lens 24. As shown in the drawings the viewing device 40 is mounted beside the objective lens 30 and focusing tube 15. The viewing device 40 comprises, generally, an open ended tubular body 41, a lens mount or holder 42 at the forward end of the body, an objective lens device 43 mounted in the lens holder 42, a screen or ground glass 44 mounted in the body to receive the image from the objective lens 43 and a magnifying glass or lens 45 mounted in the body so that the operator views the image on the ground glass through it. The body 41 is rectangular in cross-sectional configuration and diverges rearwardly being considerably larger in cross section at its rear end than at its forward end.

The lens holder 41 is fixed to or permanently mounted at the forward end of the body and may be considered a part, or continuation, of the body. The objective lens 43, which may be of any suitable construction, is suitably mounted at the holder 42.

The ground glass 44 is located or mounted in the body 41 the proper distance behind the objective lens device 43 and is preferably in the form of a plano convex lens having its plane face ground to receive an image and arranged to face the objective lens and its convex face polished and facing rearwardly. The convex rear face of the ground glass operates to condense or converge the light passing rearwardly from the ground face.

The magnifying glass or lens 45 is located or mounted in the body 41 at the proper distance to the rear of the ground glass and is in the form of a concavo convex lens. In accordance with my invention this lens is mounted so that its convex face or side faces rearwardly. This arrangement of the magnifying lens causes light falling on the lens from or through the rear of the body to be convergently reflected by the faces of the lens so that its effect on the eye of the operator is minimized.

In accordance with the preferred form of construction the ground glass 44 and magnifying lens 45 are removably mounted in the body in suitable guideways 50 and a part 51, for instance, a portion of the top of the body, is removable so that the glass and lens can be removed when desired.

In accordance with my invention the viewing device is detachably mounted on the camera so that it is adjustable into proper alignment with the object to be viewed and is shiftable or movable out of position at the side of the body 12 so that it does not interfere with movement or operation of parts at the side of the body. The preferred form of my invention provides a pivotable mounting for the viewing device 40 whereby the device can be swung away from the side of the body when desired. The pivotal axis is preferably vertically disposed and positioned so that it serves also as the axis about which the device may be adjusted to bring it into proper alignment with the object to be viewed. In the preferred form of the invention shown in the drawings the mounting includes a bracket 60 detachably mounted on the side of the head 11 and pivotally supporting the viewing device. The particular bracket 60, shown in the drawings, includes a dove-tailed part 61 slidable vertically into a suitable or correspondingly shaped socket 62 at the outer side of the projection 31 of the head. Suitable locking means may be provided for this connection controlled by a screw 61$^a$. An arm 63 extends from the part 61 and pivotally carries the viewing device and an arm 64 extends from the part 61 to form a part of a means for setting the viewing device in adjusted position. The arm 63 is yoked at its outer end and receives a lug 66 projecting from the inner side of the viewing device. A pivot pin 67 extends through the yoked part of the arm and the lug 66 to pivotally connect the bracket and viewing device. The arm 63 is shaped and proportioned so that the viewing device can be swung to a position clear of the parts at the side of the camera body 12. In the particular case shown in the drawings the arm 63 extends outwardly and somewhat forward so that the viewing device can be swung forward to a position where the door of the body can be opened.

Means provided for setting the viewing device in proper position or alignment with the object to be viewed may include a clamping nut 70, carried by a stud 71 extending from the top of the viewing device, and adapted to engage a head 73, on the outer end of the arm 64. The head 73 on the end of the arm 64 is provided with a notch 75 to receive a stud 71. The notch 75 is formed concentric with the axis of the pivot pin 67 so that the stud will pass freely into and out of it. When it is desired to set the viewing device against movement the clamping nut 70 is screwed down on the stud 71 clamping the head 73 tightly against the top of the body 41. When it is desired to move the viewing device to a position where it does not interfere with the opening of the door of the body 12 the clamping nut 70 is released and the viewing device is swung in the direction indicated by the arrow A in Fig. 2 causing the stud to pass out of the notch and the entire device to swing forward. Upon returning the viewing device to operating position the stud enters the notch 75 and the device can again be set in the desired position by tightening the clamping nut on the stud. If desired, an indicating point 80 may be provided on the head and a suitable scale 81 may be provided on the top of the body 41 so that the operator can readily determine the angular position of the viewing device with reference to the body of the camera.

From the foregoing description it is believed that the operation of the device will be apparent. When the camera is in operation the viewing device 40 is in the position shown in the drawings, being adjusted into proper line with the object being photographed. When it is desired to open the body of the camera the viewing device is released by releasing the clamping nut 70, and is swung forward as indicated by the arrow A in Fig. 2 until it is clear of the path of the movement of the door 20. When the door 20 has been closed the viewing device 40 may be returned to operating position and when properly adjusted may be set by tightening the clamp nut 70.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. In combination, a camera including a body having an aperture and having a movable part at one side, a viewing device, and means for detachably mounting the device at said side of the body so that it is movable into and out of position where it interferes with movement of said part, said means including a bracket detachably mounted on said side of the body at the forward end thereof and having an arm projecting from the camera, and a fixed pivotal connection between the arm and viewing device supporting the viewing device so that it is adjustable in the horizontal alinement with the camera aperture.

2. In combination, a camera including a body having a movable part at one side, a viewing device, and means for detachably mounting the device at said side of the body so that it is movable into and out of position where it interferes with movement of said part, said means including a bracket detachably mounted on the camera and having an arm projecting from the camera to pivotally carry the viewing device, a second arm extending to the device, and means for releasably connecting the second arm and the device to hold the device against pivotal movement.

3. In combination, a camera including a body having a movable part at one side, a viewing device, and means for detachably mounting the device at said side of the body so that it is movable into and out of position where it interferes with movement of said part, said means including a bracket detachably mounted on the camera and having an arm projecting from the camera to pivotally carry the viewing device, a second arm extending to the device, a slotted head on the second arm, a projection on the viewing device to enter the slotted head when the viewing device is in operating position, and a clamp member carried by the projection to engage the head and set the viewing device against movement.

In witness that I claim the foregoing I have hereunto subscribed my name this 11 day of July 1925.

GEORGE A. MITCHELL.